(12) United States Patent
Cheng et al.

(10) Patent No.: US 9,869,750 B2
(45) Date of Patent: Jan. 16, 2018

(54) OTDOA IN UNLICENSED BAND FOR ENHANCEMENTS OF HORIZONTAL AND VERTICAL POSITIONING

(71) Applicant: Alcatel-Lucent USA Inc., Murray Hill, NJ (US)

(72) Inventors: Fang-Chen Cheng, Randolph, NJ (US); Ren Da, Warren, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 71 days.

(21) Appl. No.: 14/674,495

(22) Filed: Mar. 31, 2015

(65) Prior Publication Data
US 2016/0223641 A1 Aug. 4, 2016

Related U.S. Application Data
(60) Provisional application No. 62/109,874, filed on Jan. 30, 2015.

(51) Int. Cl.
*G01S 5/10* (2006.01)
*G01S 5/00* (2006.01)
*H04W 64/00* (2009.01)

(52) U.S. Cl.
CPC .............. *G01S 5/10* (2013.01); *G01S 5/0036* (2013.01); *H04W 64/00* (2013.01)

(58) Field of Classification Search
CPC ......... H04W 64/00; G01S 5/10; G01S 5/0036
USPC .............................................. 455/456.1-457
See application file for complete search history.

(56) References Cited

U.S. PATENT DOCUMENTS

| | | | | |
|---|---|---|---|---|
| 9,173,183 | B1* | 10/2015 | Ray | H04W 56/0065 |
| 2007/0040742 | A1* | 2/2007 | Choi | G01S 19/48 |
| | | | | 342/450 |
| 2010/0172310 | A1* | 7/2010 | Cheng | H04W 64/00 |
| | | | | 370/329 |
| 2010/0331013 | A1* | 12/2010 | Zhang | G01S 5/0242 |
| | | | | 455/456.2 |
| 2011/0105144 | A1 | 5/2011 | Siomina et al. | |
| 2014/0254402 | A1 | 9/2014 | Aldana | |
| 2015/0263837 | A1* | 9/2015 | Patel | H04L 27/0006 |
| | | | | 370/329 |
| 2016/0095080 | A1* | 3/2016 | Khoryaev | G01S 5/0284 |
| | | | | 455/456.1 |

FOREIGN PATENT DOCUMENTS
WO  WO-2010/030825 A1  3/2010

OTHER PUBLICATIONS
International Search Report and Written Opinion dated May 9, 2016, issued in International Application No. PCT/US2016/014529.

\* cited by examiner

*Primary Examiner* — Marisol Figueroa
(74) *Attorney, Agent, or Firm* — Harness, Dickey & Pierce, P.L.C.

(57) ABSTRACT

A user equipment measures a time difference of arrival of a plurality of signals received at the user equipment, wherein at least one of the plurality of signals is received at the user equipment on at least one unlicensed band. The user equipment then reports the time difference of arrival measurements for the plurality of signals to a location computation center along with a time stamp for each of the measurements. The location computation center then determines the location of the user equipment based on the reported time difference of arrival measurements.

19 Claims, 6 Drawing Sheets

OTDOA IN UNLICENSED BAND FOR ENHANCEMENTS OF HORIZONTAL AND VERTICAL POSITIONING

CROSS-REFERENCE TO RELATED APPLICATION(S)

This non-provisional patent application claims priority under 35 U.S.C. §119(e) to provisional U.S. application No. 62/109,874 filed on Jan. 30, 2015 in the United States Patent and Trademark Office, the entire contents of which are incorporated herein by reference.

BACKGROUND

At the $3^{rd}$ Generation Partnership Project (3GPP) Technical Specification Group Radio Access Network (TSG RAN) meeting #65, the following objectives of a study of indoor positioning techniques were agreed upon:
  i. Study techniques for radio access technology (RAT)-dependent and RAT-independent indoor positioning to determine potential 3GPP positioning enhancements in indoor and other challenging environments (e.g., urban canyons). RAT-dependent techniques include observed time difference of arrival (OTDOA), uplink-time difference of arrival (UTDOA), enhanced cell identification (E-CID), radio frequency pattern matching (RFPM), etc. RAT-independent systems include assisted global navigation satellite system (A-GNSS), Terrestrial Beacon Systems, etc.
  ii. Evaluate physical layer design options, enhanced measurements, and/or any additional impacts (e.g., specification impacts, coexistence issues for any identified positioning scheme, etc.) or enhancements, as applicable per technology, for RAT-dependent and RAT-independent positioning systems, including suitable frequencies and signals. For performance evaluations, this includes specifically considering location accuracy (including latitude, longitude and altitude), yield, and time to fix.
  iii. For identified positioning solutions, study the corresponding potential impacts or enhancements to the higher layers to support indoor positioning.

In connection with studying techniques for RAT-dependent and RAT-independent indoor positioning, it was also agreed to:
  i. Define a three-dimensional (3D) system model, including an indoor channel model, to study indoor positioning;
  ii. Develop baseline simulation scenarios and evaluate the corresponding baseline performance of existing positioning techniques (e.g., A-GNSS, OTDOA, UTDOA, E-CID, or hybrids thereof) for indoor environments to establish a baseline performance; and
  iii. For the performance evaluations, specifically consider location accuracy (including latitude, longitude and altitude), yield, and time to fix.

The study of indoor positioning is intended to meet the anticipated new requirements of the United States Federal Communications Commission (FCC) with regard to enhancement of horizontal position determination within about 50 meters about 67% of time and additional vertical position determination within about 3 meters about 67% of time.

SUMMARY

One or more example embodiments provide methods, apparatuses, computer program products, and/or non-transitory computer-readable storage mediums.

At least one example embodiment provides a scheme to enhance horizontal and/or vertical position determination accuracy by allowing more reference signals to be transmitted (e.g., exclusively) for time difference of arrival (TDOA) measurements (e.g., at a user equipment (UE)). In at least one example embodiment, these additional reference signals are transmitted on one or more unlicensed bands. Compared with conventional solutions, the proposed scheme may be beneficial for both $3^{rd}$ Generation Partnership Project (3GPP) Release 13 (Rel-13) and legacy UEs for indoor positioning features.

At least one example embodiment provides a user equipment, comprising: a processor configured to measure a time difference of arrival of a plurality of signals received at the user equipment, at least one of the plurality of signals having been received at the user equipment on at least one unlicensed band; and a transceiver connected to the processor, the transceiver being configured to report the measurements for the plurality of signals to a location computation center along with a time stamp for each of the measurements.

According to at least some example embodiments, the transceiver may be further configured to: receive the at least one of the plurality of signals from a network node, the at least one of the plurality of signals including position information associated with a geographical position of the network node.

The position information may include longitude, latitude and altitude information for the network node. At least one other of the plurality of signals may be received at the user equipment on a licensed band. The licensed band may be a Long Term Evolution (LTE) band, and/or the unlicensed band may be one of WiFi, LTE-U, global positioning system (GPS) signals, cordless phones, medical equipment, weather radar and Bluetooth.

At least one other example embodiment provides a location computation center comprising: a transceiver configured to receive, from a user equipment, time difference of arrival measurements for a plurality of signals along with a time stamp for each of the measurements, at least one of the plurality of signals having been received at the user equipment on an unlicensed band; and a processor connected to the transceiver, the processor being configured to calculate a position of the user equipment based on the received measurements from the user equipment.

According to at least some example embodiments, the at least one of the plurality of signals may include position information associated with a geographical position of a network node from which the user equipment has received the at least one of the plurality of signals.

At least one other example embodiment provides a wireless communications network node, comprising: a wireless transceiver configured to transmit a terrestrial location specific service reference signal to a user equipment on at least one unlicensed band, the location specific service reference signal being dedicated to providing position information for the wireless communications network node to the user equipment.

The wireless transceiver may be further configured to receive, from a network provider, the position information for the wireless communications network node, the position information being associated with a geographical position of the wireless communications network node. The position information may include longitude, latitude and altitude information for the wireless communications network node. The wireless communications network node may be one of a wireless local area network (WLAN) access point (AP) and a base station.

The wireless transceiver may be further configured to transmit signals to the user equipment on a licensed band. The licensed band may be a Long Term Evolution (LTE) band. The at least one unlicensed band may include at least one of WiFi, LTE-U, global positioning system (GPS) signals, cordless phones, medical equipment, weather radar and Bluetooth.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
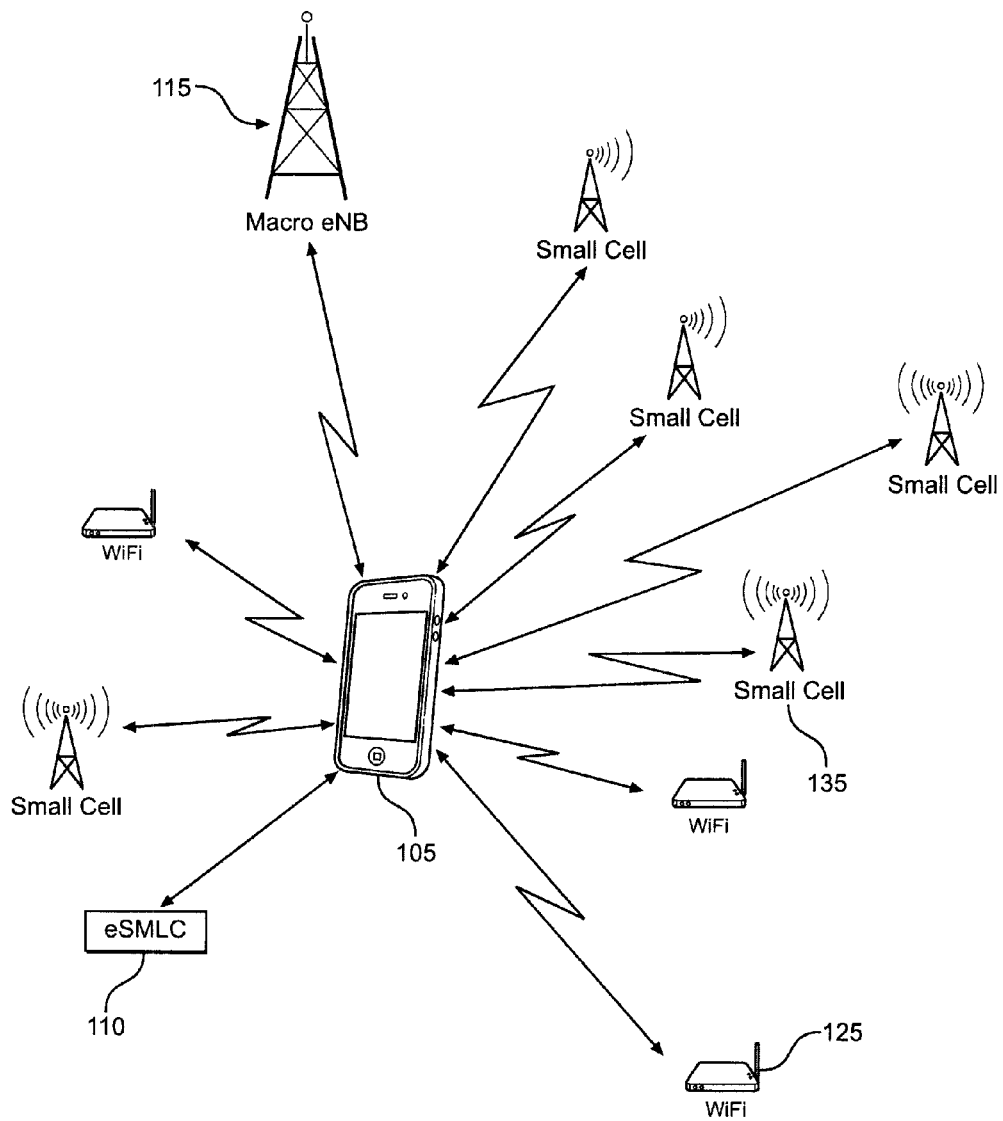
FIG. 1 illustrates a deployment scenario of a network of nodes for transmitting LCS-RS on an unlicensed band, according to an example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, gateways, servers, wireless, WiFi or wireless local area network (WLAN) access points, wireless routers, WLAN gateways, serving mobile location centers (eSMLCs), user equipments (UEs) including multi-mode UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a transceiver in communication with and providing wireless resources to users in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a transceiver in communication with and providing wireless resources (e.g., LTE, 3G, WiFi, etc.) to users in a geographical coverage area that is, in most cases, smaller than the geographical coverage area covered by a macro eNB or cell. As discussed herein, small wireless cells may have all functionally associated with conventional, well-known base stations in addition to the capability and functionality discussed herein. In this regard, the small wireless cells may include a base station or eNB. Small wireless cells according to at least some example embodiments may also serve as WLAN (or WiFi) access points (APs) providing WLAN (or WiFi) resources for devices within range of the small wireless cell.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WiFi network or WLAN. The UEs discussed herein may be multi-mode UEs capable of communicating over at least LTE and WiFi.

As discussed herein, a WiFi router or access point (WiFi AP) may be considered synonymous to, and may hereinafter be occasionally referred to as a wireless access point, wireless router, wireless local area network (WLAN) access point, etc., and describes a transceiver in communication with, and providing WiFi resources for, client devices in range of and attached to the WiFi AP. The WiFi AP allows wireless client devices (e.g., electronic devices having a WiFi transceiver) to connect to other (e.g., wireless and/or wired) networks, such as the Internet.

Generally, as discussed herein, a WiFi AP may be any well-known wireless access point, router, or other physical computer hardware system, including one or more processors, various communication interfaces (e.g., both wireless and wired), a computer readable medium, etc. The one or more interfaces may be configured to transmit/receive data signals via a wireless connection over a WLAN to/from one or more other devices, and also communicate with the Internet, for example over a wired connection.

According to example embodiments, UEs, small wireless base stations (or cells), eNBs, wireless access points (APs), WiFi APs, wireless routers, servers, WLAN gateways, eSM-LCs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

According to one or more example embodiments, the terms 'licensed' and 'unlicensed' as used herein with reference to radio spectrum, frequencies, or bands may refer, respectively, to licensed and unlicensed portions of the radio spectrum as defined by a national, regional and/or government organization including, for example, the United States Federal Communications Commission (FCC), which defines the known 5 GHz unlicensed band as an unlicensed portion of the radio spectrum. Further, licensed portions of the radio spectrum are portions of the radio spectrum for which an entity (e.g., service provider or communications network operator) must obtain a license from a national, regional and/or government organization in order for the entity to use the portions of the radio spectrum. Unlicensed portions of the radio spectrum are portions of the radio spectrum that do not require an entity to obtain a license from a national, regional and/or government organization in order for the entity to use the portions of the radio spectrum.

The operation of an unlicensed band is based on the regulation of each country. Example applications running on unlicensed spectrum bands include: WiFi and WLANs; cordless phones; medical equipment; weather radar; Bluetooth; etc. Different applications running on unlicensed bands are uncoordinated. LTE on unlicensed band (LTE-U) is an on-going Rel-13 study item of Licensed Assisted Access (LAA).

Licensed bands for LTE may be found in 3GPP TS36.101 and 3GPP TS36.104, the entire contents of which are hereby incorporated by reference.

Conventional positioning technologies, such as assisted global navigation satellite system (A-GNSS), observed time difference of arrival (OTDOA), uplink-time difference of arrival (UTDOA), and enhanced cell identification (E-CID), are mainly used for outdoor positioning in homogeneous macro cell deployment scenarios.

A-GNSS technologies rely on a UE receiving GNSS signals with network assistance for the initial search. Examples of GNSS include a global positioning system (GPS), Modernized GPS, Galileo, global navigation satellite system (GLONASS), Space Based Augmentation Systems (SBAS), and Quasi Zenith Satellite System (QZSS).

OTDOA technologies involve measuring the timing of downlink signals received from multiple neighboring eNBs at a UE. The UE measures (or observes) the timing of the received signals using assistance data received from a positioning server, and the resulting measurements are used to locate the UE in relation to the neighboring eNBs.

UTDOA technologies involve measuring, at multiple location measurement units (LMUs), timing of uplink signals transmitted from UE. Each LMU measures the timing of the received signals using assistance data received from a positioning server, and the location of the UE is estimated using the resulting measurements.

E-CID technologies use additional UE and/or evolved Universal Terrestrial Radio Access Network (E-UTRAN) radio resource and other measurements to improve UE location from an initial estimated location based on the eNB serving the UE.

Performance of the conventional positioning technologies discussed above (e.g., A-GNSS, OTDOA, UTDOA, and E-CID) may be limited by the received signal quality for timing estimation (e.g., "hearability") and the number of transmission/reception nodes used to derive the UE's location coordinates.

For A-GNSS, performance of location estimation may be limited when there are less than a desired number of detectable satellite signals, which may be caused by block of satellite signals for UEs in certain environments, such as indoor or bad weather.

For terrestrial positioning technologies (such as, e.g., OTDOA, UTDOA, and E-CID) performance may be limited by the hearability of radio signal measurements for positioning estimation, which is caused by relatively large propagation loss and interference from other signals. As discussed herein, hearability refers to the quality of a signal received at a receiver. The relatively large propagation loss and interference occurs because the reference signals (RS) used for these terrestrial positioning techniques (e.g., OTDOA, UTDOA, and E-CID) are designed for channel estimation for wireless communication. In this regard, the transmitted power of the reference signals is designed to reach the planned coverage area and power-controlled to minimize the interference to the neighboring cells. The power controlled reference signals may hinder the detection of the measuring entity (either UE, location measurement unit (LMU), or eNB) at neighboring cells.

In a more specific example, conventional Long-Term Evolution Reference Signals (LTE RS), except for positioning reference signals (PRS), are designed for communication not position determination. As a result, the transmit power and the number of nodes for reference signal transmission are controlled to enhance signal quality and minimize interference to wireless communication in neighboring nodes, not in favor of positioning technologies, which require a UE to detect reference signals from multiple nodes.

One or more example embodiments provide additional signals for a UE to detect, measure and use in determining the UE's position. For example, one or more example embodiments involve transmission of location service specific reference signals (LCS RS) on one or more unlicensed bands from any node, such as LTE eNBs, WiFi APs, etc. The nodes are configured by network operators such that location coordinates (e.g., longitude, latitude, and altitude) for the network nodes are provisioned by network operators for UEs to measure the time difference of arrival of the LCS RSs from the nodes. The location service specific reference signals operating in the unlicensed band(s) provide sufficient signal strength for a UE to measure time difference of arrival of signals, and thus, for derivation of UE location. The location service specific reference signals may include position information associated with a geographical position of the nodes transmitting the location service specific reference signals.

Transmission of LCS-RS on the unlicensed band for positioning may be a new application (e.g., a standalone LCS-RS transmission node) or information incorporated into an existing application (e.g., WiFi or LTE-U) as long as the transmission meets the appropriate regulatory requirements of a given country. Transmission of LCS-RS as information data on existing applications, such as WiFi or LTE-U, may be more economically efficient.

Location service specific reference signals (LCS-RS) on one or more unlicensed bands for OTDOA measurements may be advantageous in that: (i) the LCS-RS and the waveform may be designed and/or optimized specifically for positioning technologies; (ii) the LCS-RS may be transmitted on one or more unlicensed bands from a standalone LCS-RS node and/or as information data from another communication node (e.g., a LTE-U node, a WiFi node, etc.) to maximize the number of signals detected by the UEs; (iii) the transmission power of LCS-RS may be maximized such that a UE receives signals with sufficient received signal qualities; and (iv) the transmission of LCS-RS need not be coordinated among transmission nodes. LCS-RS may also be referred to as PRS-like signals. In one example, LCS-RS or PRS-like signals may be RS signals similar to PRS. Properties of PRS include, for example, periodic transmission with periods of multiples of about 160 ms, a reuse factor of 6, variable bandwidth support, and a muting pattern for increasing hearability. The PRS-like signal may be based on PRS transmission on an unlicensed band with additional reference signals for channel tracking, such as a preamble. However, example embodiments should not be limited to this example.

In one example, for positioning measurements, the newly designed LCS-RS may have relatively high processing gain to improve the received signal quality for timing estimation, relatively high resistance to the interference of other signals, and relatively short initial acquisition time. When multiple signals are received (e.g., concurrently and/or simultaneously), the newly designed LCS-RS may have a relatively low cross-correlation property in asynchronous reception among signals to filter out interference when using a match filter receiver. The LCS-RS on an unlicensed band may only transmit in relatively short periods to avoid interference with other applications due to regulation. In one example, a relatively short transmission period on the unlicensed band may be about 10 milliseconds (ms) in Europe, and about 4 ms in Japan. A relatively short period may also be between about 1 ms to about 4 ms, inclusive. According to at least some example embodiments, LCS-RS may have their own waveform in order to be demodulated relatively fast and separated from other signals. According to at least one example embodiment, the waveform may be a WiFi waveform, a GPS waveform, a sensor waveform, etc.

FIG. 1 illustrates a deployment scenario of a network of nodes for transmitting LCS-RS on an unlicensed band, according to an example embodiment.

Referring to FIG. 1, the network of nodes includes: a 3GPP Long Term Evolution (LTE) macro eNB (also referred to as a LTE macro cell) 115; a plurality of small cells 135; and WiFi routers (or access points) 125 configured to transmit LCS-RS. In this example, each of the nodes in the network are transmission nodes, and are allocated non-homogeneously and in an unplanned manner. According to one or more example embodiments, a non-homogeneous and unplanned manner allocation refers to irregular overlapped coverage areas (e.g., relatively large, relatively small, or no overlapped coverage areas) among transmission nodes due to limitations of transmission node allocation (e.g., no access to some indoor locations, no land for antenna placement, etc.).

The network shown in FIG. 1 also includes a serving mobile location center (eSMLC) 110. The eSMLC 110 may also be referred to as a location computation center.

In addition to the functionality discussed herein, the eSMLC 110 manages support of different location services for target UEs, including positioning of UEs and delivery of assistance data to UEs. The eSMLC 110 may interact with a serving eNB for a target UE to obtain position measurements for the UE, including uplink measurements made by the eNB and downlink measurements made by the UE that are provided to the eNB as part of other functions such as for support of handover.

The eSMLC 110 may also interact with target UEs to deliver assistance data if requested for a particular location service, or to obtain a location estimate if such an estimate is requested.

For positioning of a target UE, the eSMLC 110 decides on the position methods to be used based on factors including, for example, the LCS client type, the required QoS, UE positioning capabilities, and eNB positioning capabilities. The eSMLC 110 then invokes these positioning methods in the UE and/or serving eNB. The positioning methods may yield a location estimate for UE-based position methods and/or positioning measurements for UE-assisted and network-based position methods. The eSMLC 110 may combine all the received results and determine a single location estimate for the target UE (e.g., hybrid positioning). Additional information such as accuracy of the location estimate and velocity may also be determined by the eSMLC 110.

Also shown in FIG. 1 is a UE 105. In the example shown in FIG. 1, the UE 105 is within the coverage areas of the network nodes shown in FIG. 1 so that the UE 105 is able to receive LCS-RS from each of the network nodes.

According to at least one example embodiment, each of the LCS-RS transmission nodes is provisioned with location coordinates (e.g., longitude, latitude, and altitude) of the node itself (e.g., by the network). The longitude, latitude, and altitude of the transmission node may be assigned in advance according to the placement of the transmission node (e.g., by a network operator or a location determination system, such as one or more of the RAT-dependent techniques discussed herein.

The transmission time of the LCS-RS is also provisioned with a reference time in order for the location computation center (e.g., eSMLC) 110 to collect all measured time difference of arrival information from different network nodes, and compute the location of the UE 105, including longitude, latitude and/or altitude.

According to at least some example embodiments, the LCS-RS may be designed using a LTE PRS pattern on an unlicensed band. That is, for example, the LCS-RS may reuse LTE PRS measurements on an unlicensed band. In this example, the configuration of LTE PRS transmissions is different from PRS transmissions on the licensed band. However, UEs may reuse a conventional PRS decoder, which is well-known, for reference signal time difference (RSTD) measurements in the unlicensed band.

In another example, the LCS-RS may be designed using GPS signals on an unlicensed band. GPS uses a direct spreading sequence for transmission signals. The coarse/acquisition range code and the precision code of GPS signals may be used to transmit on the unlicensed band. Using GPS signals as LCS-RS on the unlicensed band may be advantageous in that the GPS receiver may be reused for LCS-RS processing as well as processing GPS signals. A potential drawback of using GPS signals on the unlicensed band is a longer initial acquisition period. In this example, navigation messages and almanac information may be sent through the network and need not be included in the GPS signals when transmitted on the unlicensed band.

In another example, independent and/or unique LCS-RS may be used. In this example, the signals may have relatively high processing gain at the receiver, resistance to interference, and relatively short acquisition time. In a more specific example, the LCS-RS may be spread spectrum signals, which have relatively high processing gain and relatively high resistance to interference.

In one example, the spread spectrum signals may be frequency spread according to, for example, the Zadoff-Chu sequence. Frequency spreading according to the Zadoff-Chu sequence is used in LTE uplink (UL) reference signals (RS), such as UL demodulation reference signals (DMRS) and sounding reference signals (SRS). Frequency spreading according to the Zadoff-Chu sequence is also used as the scrambling code of the reference signals at each orthogonal frequency division multiplexed (OFDM) symbol. The Zadoff-Chu sequence has an orthogonal property between different cyclic shifts of a root sequence when signals are received synchronously. Zadoff-Chu sequences do not, however, have sufficiently high cross-correlation properties between sequences when the received signals do not arrive synchronously.

Gold sequences are used for scrambling of PRS and secondary synchronization signals (SSS) in LTE networks due to their sufficiently high cross-correlation properties for asynchronous reception. As a result, the gold sequence may be more suitable for LCS-RS design over unlicensed bands since it is likely that UEs will receive LCS-RS from different nodes asynchronously.

In another example, the spread spectrum signals may be direct spreading signals in the time domain. In one example, binary pseudo-random codes may be used in time domain spreading. Direct spreading signals are used in GPS and code division multiple access (CDMA) technology for signal acquisition and identification. Direct spreading may be advantageous in that the processing gain is proportional to the length of spreading code. However, a potential drawback of direct spreading is the time of initial acquisition, which is also proportional to the length of spreading code. Examples of typical sequences used for direct spreading are Walsh codes and Gold codes, each of which are well-known. One or more of these codes may be a viable option for LCS-RS direct spread in the time domain on the unlicensed band.

In yet another example, the spread spectrum signals may be hybrid spreading signals spread in both the time and frequency domains. In one example, hybrid spreading involves a scrambling sequence in the frequency domain and across multiple symbols, and is used in the LTE random access channel (RACH). A hybrid spreading sequence may be advantageous in that relatively long spreading sequences are used, but potentially disadvantageous in that longer detection times may be required.

According to at least some example embodiments, the configuration of LCS-RS on the unlicensed band may be based on the regulatory requirements of each country and the technology for transmitting the LCS-RS. For a LTE Unlicensed (LTE-U) carrier, the LCS-RS may be considered as a period of consecutive sub-frames of data transmissions wherein the content (or payload) of data is the LCS-RS. For a WiFi transmission, the LCS-RS may be part of data transmission after the WiFi beacon.

Figure 3:
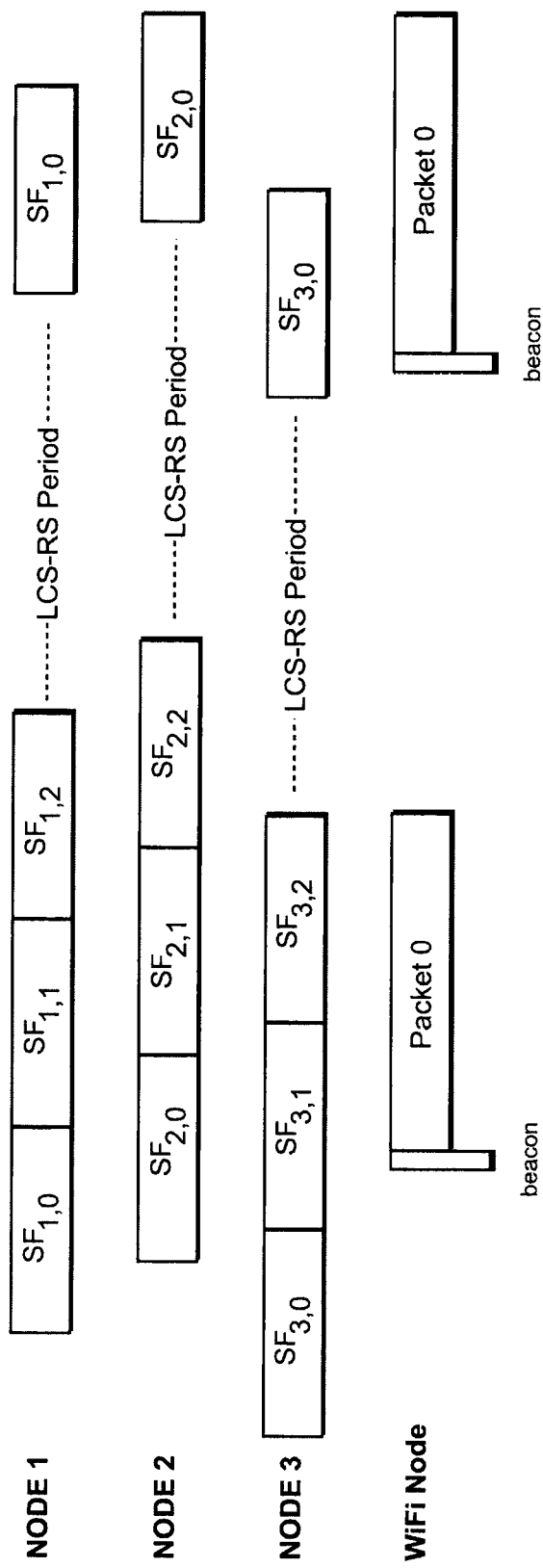
FIG. 3 illustrates an example transmission configuration for location service specific reference signals (LCS-RS), according to an example embodiment.

FIG. 3 illustrates an example transmission configuration of LCS-RS from LTE-U and WiFi nodes. In the example shown in FIG. 3, the transmissions from these nodes are asynchronous.

Referring to FIG. 3, each of subframes $SF_{1,0}$, $SF_{1,1}$ and $SF_{1,2}$ from Node 1, subframes $SF_{2,0}$, $SF_{2,1}$ and $SF_{2,2}$ from Node 2, and subframes $SF_{3,0}$, $SF_{3,1}$ and $SF_{3,2}$ from Node 3 include the LCS-RS as payload data. Similarly, the packet Packet0 following the beacon transmitted by the WiFi node also includes the LCS-RS as payload data.

Still referring to FIG. 3, the LCS measurement period is similar to the LTE PRS period, which is a multiple of about 160 ms. In one example, each measurement period may contain between 1 and 6 subframes.

In the example shown in FIG. 3, each of the LTE-U Nodes 1, 2 and 3 may correspond to one of the LTE macro eNB 115 and a small cell 135 shown in FIG. 1. The WiFi node may correspond to the WiFi router (or access point) 125 shown in FIG. 1.

For LTE-U, the unlicensed carrier is configured as a secondary cell (SCell) of a licensed LTE carrier. The configuration of LCS-RS transmission, such as transmission time, transmission period, and transmission cycle, may be configured through higher layer signaling from the LTE licensed carrier. The transmission of LCS-RS in subframes may be indicated over a downlink (DL) control channel similar to that used in conjunction with normal data transmission. If a WiFi node (such as WiFi router 125 shown in FIG. 1) belongs to the same operator as the LTE carrier, then the transmission of the LCS-RS on a WiFi carrier may have the same or substantially the same configuration as that of the LTE carrier.

Figure 4:
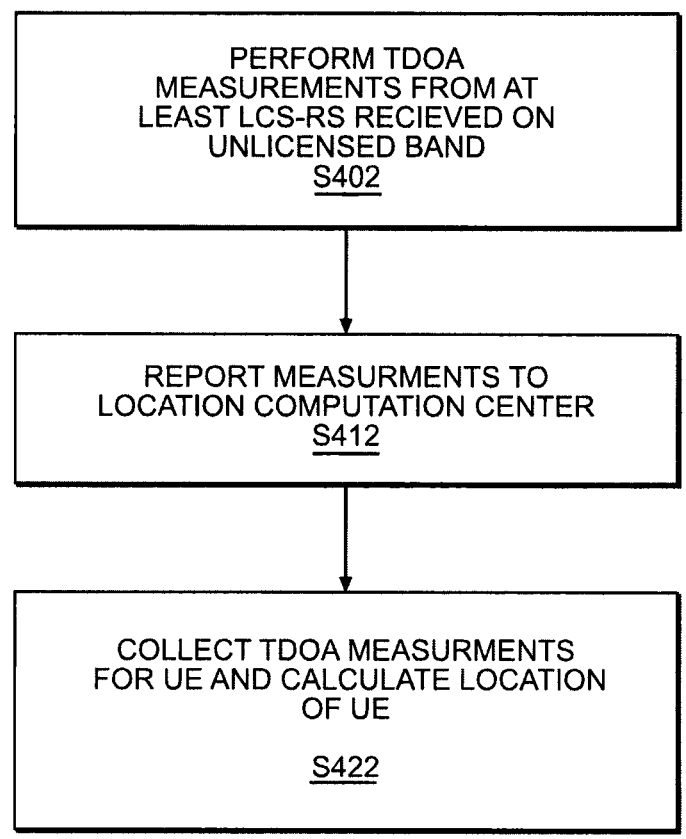
FIG. 4 is a flow chart illustrating a method for determining location of a UE based at least partially on LCS-RS received on an unlicensed band.

FIG. 4 is a flow chart illustrating a method for determining location of a UE based at least partially on LCS-RS received on the unlicensed band. The method shown in FIG. 4 will be discussed with regard to the deployment scenario shown in FIG. 1 for example purposes. However, example embodiments should not be limited to this example.

Referring to FIG. 4, at step S402, the UE 105 performs time difference of arrival (TDOA) measurements from at least LCS-RS received from nodes on the unlicensed band. In one example, the UE 105 performs TDOA measurements by peak detection of correlated signals between the received signals and the LCS-RS signals. The detection is the timing offset between the LCS-RS transmission node and the serving cell for the UE 105. Because methods for performing TDOA measurements are generally well-known, further detailed discussion is omitted.

At step S412, the UE 105 reports the TDOA measurements to the location computation center 110 along with a time stamp for each measurement. The UE 105 sends (or transmits) the measurements to the location computation center 110 on the U-plane or C-plane. In one example, the UE 105 sends (or transmits) the TDOA measurements to the location computation center 110 in a OTDOA-SignalMeasurementInformation message, which is used to carry Reference Signal Time Difference (RSTD) from a UE to an eSMLC in the LTE Positioning Protocol (LPP).

At step S422, the location computation center 110 collects all TDOA measurements with different time stamps from the UE 105, and calculates the location of the UE 105 based on the received TDOA measurements. In one example, the location computation center 110 may calculate the location of the UE 105 using conventional methods for calculating the location of UEs using TDOA measurements. Because methods such as these are well-known, a more detailed discussion is omitted for the sake of brevity.

Figure 2A:
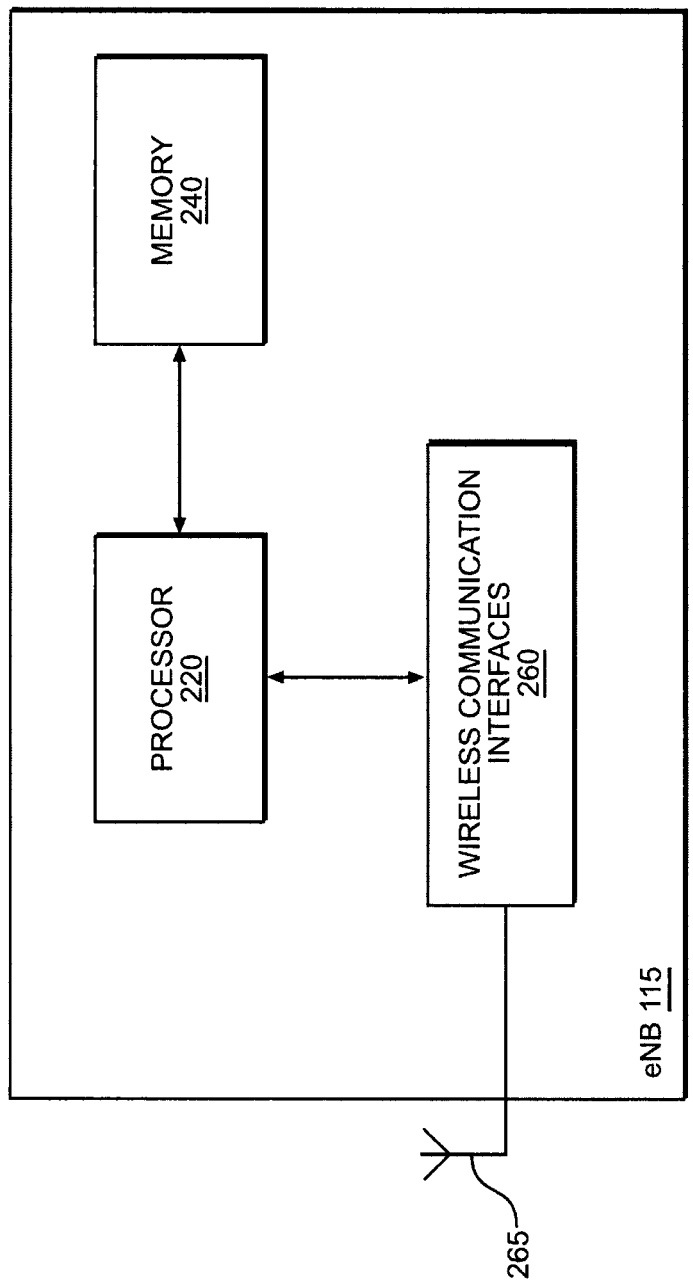
FIG. 2A illustrates an example embodiment of an eNodeB.

FIG. 2A illustrates an example embodiment of the LTE macro eNB 115 shown in FIG. 1. As shown, the LTE macro eNB 115 includes: a memory 240; a processor 220 connected to the memory 240; various interfaces 260 connected to the processor 220; and an antenna 265 connected to the various interfaces 260. The various interfaces 260 and the antenna 265 may constitute a transceiver for transmitting/receiving data from/to the LTE macro eNB 115. As will be appreciated, depending on the implementation of the LTE macro eNB 115, the LTE macro eNB 115 may include many more components than those shown in FIG. 2A. However, it is not necessary that all of these generally conventional components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the LTE macro eNB 115 (e.g., functionalities of a base station, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the interfaces 260 and programs stored in the memory 240 to set forth the special purpose functionalities of the LTE macro eNB 115 will vary depending on the implementation of the LTE macro eNB 115.

Although only the LTE macro eNB 115 is illustrated in more detail in FIG. 2A, it should be understood that each of the small cells, and the WiFi (or WLAN) routers and/or APs shown in FIG. 1 may be structured similarly and include similar components.

Figure 2B:
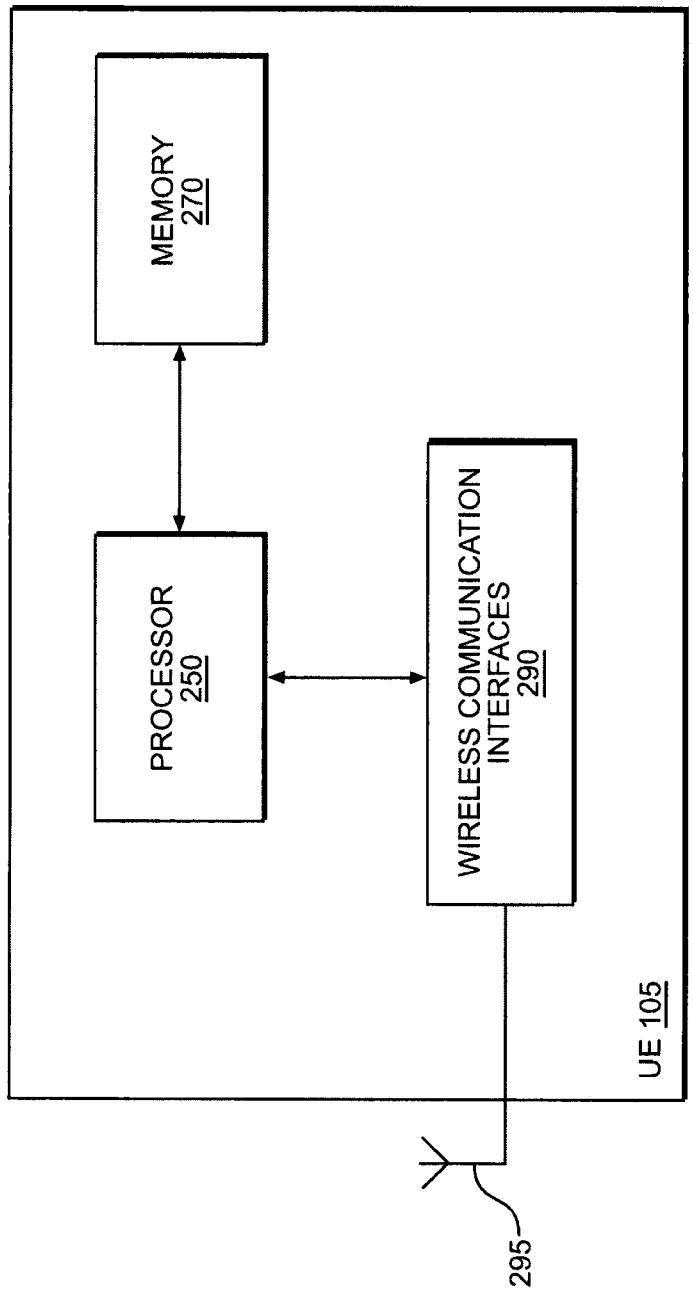
FIG. 2B illustrates an example embodiment of a user equipment (UE)

FIG. 2B illustrates one example of the UE 105 shown in FIG. 1.

Referring to FIG. 2B, the UE 105 includes: a memory 270; a processor 250 connected to the memory 270; various interfaces 290 connected to the processor 250; and an antenna 295 connected to the various interfaces 290. The various interfaces 290 and the antenna 295 may constitute a transceiver for transmitting/receiving data from/to the LTE macro UE 105. As will be appreciated, depending on the implementation of the UE 105, the UE 105 may include many more components than those shown in FIG. 2B. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 105 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 105 will vary depending on the implementation of the UE 105.

Figure 2C:
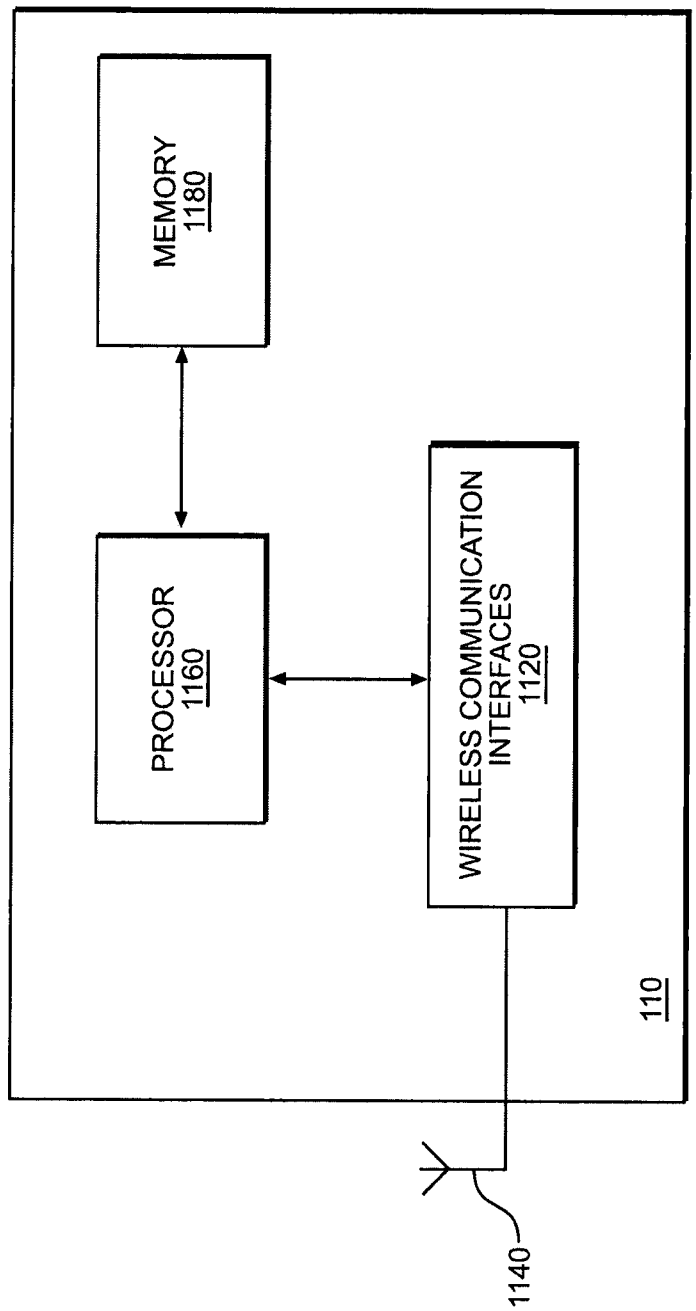
FIG. 2C illustrates an example embodiment of a location computation center.

FIG. 2C illustrates an example embodiment of the location computation center 110 shown in FIG. 1. As shown, the location computation center 110 includes: a memory 1180; a processor 1160 connected to the memory 1180; various interfaces 1120 connected to the processor 1160; and an antenna 1140 connected to the various interfaces 1120. In one example, the location computation center 110 may be a eSMLC. The various interfaces 1120 and the antenna 1140 may constitute a transceiver for transmitting/receiving data from/to the location computation center 110. As will be appreciated, depending on the implementation of the location computation center 110, the location computation center 110 may include many more components than those shown in FIG. 2C. However, it is not necessary that all of these generally conventional components be shown in order to disclose the illustrative example embodiment.

The memory 1180 may be a computer readable storage medium that generally includes a random access memory (RAM), read only memory (ROM), and/or a permanent mass storage device, such as a disk drive. The memory 1180 also stores an operating system and any other routines/modules/applications for providing the functionalities of the location computation center 110 (e.g., functionalities of an eSMLC, methods according to the example embodiments, etc.) to be executed by the processor 1160. These software components may also be loaded from a separate computer readable storage medium into the memory 1180 using a drive mechanism (not shown). Such separate computer readable storage medium may include a disc, tape, DVD/CD-ROM drive, memory card, or other like computer readable storage medium (not shown). In some example embodiments, software components may be loaded into the memory 1180 via one of the various interfaces 1120, rather than via a computer readable storage medium.

The processor 1160 may be configured to carry out instructions of a computer program by performing the arithmetical, logical, and input/output operations of the system. Instructions may be provided to the processor 1160 by the memory 1180.

The various interfaces 1120 may include components that interface the processor 1160 with the antenna 1140, or other input/output components. As will be understood, the interfaces 1120 and programs stored in the memory 1180 to set forth the special purpose functionalities of the location computation center 110 will vary depending on the implementation of the location computation center 110.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A user equipment, comprising:
a processor configured to measure a time difference of arrival of a plurality of signals received at the user equipment, at least one of the plurality of signals being a location specific service reference signal dedicated to providing only position information as payload information, for a network node to the user equipment, the at least one of the plurality of signals having been received at the user equipment on at least one unlicensed band of an unlicensed wireless carrier, which is configured as a secondary cell of a licensed carrier; and
a transceiver connected to the processor, the transceiver being configured to report the time difference of arrival measurements for the plurality of signals to a location computation center along with a time stamp for each of the measurements.

2. The user equipment of claim 1, wherein the position information is associated with a geographical position of the network node.

3. The user equipment of claim 2, wherein the position information includes longitude, latitude and altitude information for the network node.

4. The user equipment of claim 1, wherein at least one other of the plurality of signals is received at the user equipment on a licensed band.

5. The user equipment of claim 4, wherein the licensed band is a Long Term Evolution (LTE) band.

6. The user equipment of claim 5, wherein the at least one unlicensed band includes at least one of WiFi, LTE-U, global positioning system (GPS) signals, cordless phones, medical equipment, weather radar and Bluetooth.

7. A location computation center comprising:
a transceiver configured to receive, from a user equipment, time difference of arrival measurements for a plurality of signals along with a time stamp for each of the time difference of arrival measurements, at least one of the plurality of signals being a location specific service reference signal dedicated to providing only position information as payload information, for a network node to the user equipment, the at least one of the plurality of signals having been received at the user equipment on at least one unlicensed band of an unlicensed wireless carrier, which is configured as a secondary cell of a licensed carrier; and
a processor connected to the transceiver, the processor being configured to calculate a position of the user equipment based on the received time difference of arrival measurements from the user equipment.

8. The location computation center of claim 7, wherein the position information is associated with a geographical position of a network node from which the user equipment has received the at least one of the plurality of signals.

9. The location computation center of claim 8, wherein the position information includes longitude, latitude and altitude information for the network node.

10. The location computation center of claim 7, wherein at least one other of the plurality of signals is received at the user equipment on a licensed band.

11. The location computation center of claim 10, wherein the licensed band is a Long Term Evolution (LTE) band.

12. The location computation center of claim 11, wherein the at least one unlicensed band includes at least one of WiFi, LTE-U, global positioning system (GPS) signals, cordless phones, medical equipment, weather radar and Bluetooth.

13. A wireless communications network node, comprising:
a wireless transceiver configured to transmit a terrestrial location specific service reference signal to a user equipment on at least one unlicensed band of an unlicensed wireless carrier, which is configured as a secondary cell of a licensed carrier, the location specific service reference signal being dedicated to providing only position information as payload information, for the wireless communications network node to the user equipment.

14. The wireless communications network node of claim 13, wherein the wireless transceiver is further configured to receive, from a network provider, the position information for the wireless communications network node, the position information being associated with a geographical position of the wireless communications network node.

15. The wireless communications network node of claim 14, wherein the position information includes longitude, latitude and altitude information for the wireless communications network node.

16. The wireless communications network node of claim 13, wherein the wireless communications network node is one of a wireless local area network (WLAN) access point (AP) and a base station.

17. The wireless communications network node of claim 13, wherein the wireless transceiver is further configured to transmit signals to the user equipment on a licensed band.

18. The wireless communications network node of claim 17, wherein the licensed band is a Long Term Evolution (LTE) band.

19. The wireless communications network node of claim 18, wherein the at least one unlicensed band includes at least one of WiFi, LTE-U, global positioning system (GPS) signals, cordless phones, medical equipment, weather radar and Bluetooth.

* * * * *